(12) United States Patent
Jones et al.

(10) Patent No.: US 12,304,181 B2
(45) Date of Patent: *May 20, 2025

(54) RECYCLABLE LAMINATED POLYOLEFIN-BASED FILM STRUCTURES

(71) Applicant: ProAmpac Holdings Inc., Cincinnati, OH (US)

(72) Inventors: Alexander David Jones, Newport, KY (US); Amir Saffar, Montreal (CA); Patrick Allen Batten, New London, WI (US); Louann Susan Mueller, Kaukauna, WI (US); Louis Vance Fortenberry, Saint Peters, MO (US); Kylie Noel Diges, Appleton, WI (US); Seyed Hesamoddin Tabatabaei, Mason, OH (US)

(73) Assignee: ProAmpac Holdings Inc., Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/963,679

(22) Filed: Oct. 11, 2022

(65) Prior Publication Data

US 2023/0051089 A1 Feb. 16, 2023

Related U.S. Application Data

(63) Continuation of application No. 17/332,658, filed on May 27, 2021, now Pat. No. 11,535,013.
(Continued)

(51) Int. Cl.
*B32B 27/08* (2006.01)
*B32B 7/12* (2006.01)
*B32B 27/32* (2006.01)

(52) U.S. Cl.
CPC ............ *B32B 27/08* (2013.01); *B32B 7/12* (2013.01); *B32B 27/32* (2013.01); *B32B 2255/10* (2013.01)

(58) Field of Classification Search
None
See application file for complete search history.

(56) References Cited

U.S. PATENT DOCUMENTS

| | | |
|---|---|---|
| 4,364,989 A | 12/1982 | Moyle |
| 4,623,594 A | 11/1986 | Keough |

(Continued)

FOREIGN PATENT DOCUMENTS

| | | |
|---|---|---|
| EP | 3785895 A1 | 3/2021 |
| WO | 2008094085 A1 | 8/2008 |

(Continued)

OTHER PUBLICATIONS

Extended European Search Report dated Dec. 16, 2022, received in European Patent Application No. 21801393.6.
(Continued)

*Primary Examiner* — Michael C Miggins
(74) *Attorney, Agent, or Firm* — McLane Middleton, Professional Association

(57) ABSTRACT

A recyclable, laminated polyolefin-based film structure comprises two or more film plies laminated to each other. Each of the laminated film plies comprises one or more polyolefin-based films. The film structure has an energy-cured coating layer disposed on the outermost outward facing surface of the film structure and a printed ink layer on an interior surface of one of the polyolefin-based polyolefin layers. In certain embodiments, the outermost surface of the laminated polyolefin-based film structure has a melting temperature which is at least 100 degrees Celsius, and more preferably 180 degrees Celsius, higher than a melting tem-
(Continued)

perature of the innermost surface of the laminated polyolefin-based film structure.

23 Claims, 4 Drawing Sheets

Related U.S. Application Data

(60) Provisional application No. 63/030,612, filed on May 27, 2020.

(56) References Cited

U.S. PATENT DOCUMENTS

| | | | |
|---|---|---|---|
| 5,945,183 | A | 8/1999 | Johnson |
| 6,743,492 | B2 | 6/2004 | Bray et al. |
| 7,063,882 | B2 | 6/2006 | Mossbrook et al. |
| 7,147,923 | B2 | 12/2006 | Roberts et al. |
| 8,551,588 | B2 | 10/2013 | Daffner et al. |
| 8,563,122 | B1 | 10/2013 | Roberts et al. |
| 10,465,053 | B2 | 11/2019 | Breed et al. |
| 10,751,979 | B2 | 8/2020 | Grefenstein et al. |
| 11,535,013 | B2 | 12/2022 | Jones et al. |
| 11,718,075 | B2 | 8/2023 | Jones et al. |
| 11,945,198 | B2 | 4/2024 | Jones et al. |
| 11,987,026 | B2 | 5/2024 | Luettke et al. |
| 2004/0180226 | A1 | 9/2004 | Chatterjee et al. |
| 2007/0116910 | A1 | 5/2007 | Polykarpov et al. |
| 2007/0292567 | A1 | 12/2007 | Kaas et al. |
| 2008/0004411 | A1 | 1/2008 | Sukhadia et al. |
| 2009/0220717 | A1 | 9/2009 | Wilczak et al. |
| 2013/0164551 | A1 | 6/2013 | Daum |
| 2016/0023443 | A1 | 1/2016 | Klepsch |
| 2016/0024329 | A1 | 1/2016 | Zhang et al. |
| 2016/0333203 | A1 | 11/2016 | Zhang et al. |
| 2017/0113444 | A1 | 4/2017 | Harlow et al. |
| 2018/0079188 | A1 | 3/2018 | Grefenstein et al. |
| 2018/0354241 | A1 | 12/2018 | Gilbert |
| 2019/0091980 | A1 | 3/2019 | Furuya et al. |
| 2019/0218354 | A1 | 7/2019 | Casarrubias et al. |
| 2019/0224952 | A1 | 7/2019 | Clare |
| 2019/0270856 | A1 | 9/2019 | Varadarajan et al. |
| 2019/0299574 | A1 | 10/2019 | Ackermans et al. |
| 2020/0061984 | A1 | 2/2020 | Mishra et al. |
| 2020/0122439 | A1 | 4/2020 | Grefenstein et al. |
| 2020/0238674 | A1 | 7/2020 | Sehanobish et al. |
| 2020/0324513 | A1 | 10/2020 | Tian et al. |
| 2020/0324526 | A1 | 10/2020 | Berbert et al. |
| 2020/0324533 | A1 | 10/2020 | Ueno |
| 2020/0346446 | A1 | 11/2020 | Kelly |
| 2020/0368991 | A1 | 11/2020 | De Schoenmaker et al. |
| 2020/0391489 | A1 | 12/2020 | Lamtigui et al. |
| 2021/0023828 | A1* | 1/2021 | Yamada ............ B65D 31/08 |
| 2021/0114358 | A1* | 4/2021 | Paduan ............ B32B 27/34 |
| 2021/0339925 | A1 | 11/2021 | Berbert et al. |
| 2021/0370651 | A1 | 12/2021 | Jones et al. |
| 2022/0001660 | A1 | 1/2022 | Rangwalla et al. |
| 2022/0024191 | A1 | 1/2022 | Jones et al. |
| 2023/0046183 | A1 | 2/2023 | Luettke et al. |
| 2024/0262088 | A1 | 8/2024 | Jones et al. |
| 2024/0294003 | A1 | 9/2024 | Luettke et al. |
| 2024/0300229 | A1 | 9/2024 | Luettke et al. |

FOREIGN PATENT DOCUMENTS

| | | |
|---|---|---|
| WO | 2016100277 A1 | 6/2016 |
| WO | 2017180496 A1 | 10/2017 |
| WO | 2019035907 A1 | 2/2019 |
| WO | 2020020544 A1 | 1/2020 |
| WO | 2000016975 A1 | 3/2020 |
| WO | 2020045629 A1 | 3/2020 |
| WO | 2020050860 A1 | 3/2020 |
| WO | 2020074688 A1 | 4/2020 |
| WO | 2020112148 A1 | 6/2020 |
| WO | 2020131105 A1 | 6/2020 |
| WO | 2020136674 A1 | 7/2020 |
| WO | 2020190507 A1 | 9/2020 |
| WO | 2021011213 A1 | 1/2021 |

OTHER PUBLICATIONS

English machine translation of PCT Publication No. WO 2020/045629 (Mar. 5, 2020).
Anukiruthika et al., "Multilayer packaging: Advances in preparation techniques and emerging food applications," Comprehensive Reviews in Food Science and Food Safety, vol. 19, pp. 1156-1186 (Apr. 20, 2020).
Butler et al., "PE-Based Multilayer Film Structures," Multilayer Flexible Packaging, Second Edition, pp. 281-310 (Apr. 1, 2016).
Formax, "Printing Lingo: What is a Reverse?" Feb. 11, 2018 retrieved from <http://web.archive.org/web/20180211010802/https://www.forrnaxprinting.com/blog/2010/09/printing-lingo-what-is-a-reverse>.
International Search Report and Written Opinion dated Aug. 20, 2021, received in PCT/US2021/034603.
International Search Report and Written Opinion dated Nov. 15, 2021 received in PCT/US2021/043001.
Dawidowicz et al., "Effect of food packaging material on some physicochemical properties of polyacrylate varnish layers," Food Packaging and Shelf Life, vol. 21 pp. 1-8 (Jul. 25, 2019).
Deshmukh et al., "Modification of polyethylene surface using plasma polymerization of silane," Journal of Applied Polymer Science, vol. 106, pp. 4075-4082 (Sep. 5, 2007).
Machine Translation of W02020020544A1.
International Search Report and Written Opinion in Application No. PCT/US2023/034663 dated Nov. 13, 2023, 8 pages.
Extended European Search Report in Application No. 21846731.4 dated Jun. 26, 2024, 7 pages.

* cited by examiner

| 44 | POLYOLEFIN POLYMER |

FIG. 8

| 44 | POLYOLEFIN POLYMER |
| 42 | TIE LAYER |
| 40 | BARRIER |
| 42 | TIE LAYER |
| 44 | POLYOLEFIN polymer |

FIG. 9

| 44 | POLYOLEFIN POLYMER |
| 46 | BARRIER |

FIG. 10

RECYCLABLE LAMINATED POLYOLEFIN-BASED FILM STRUCTURES

CROSS-REFERENCE TO RELATED APPLICATION

This application is a continuation of U.S. nonprovisional application Ser. No. 17/332,658 filed May 27, 2021, which, in turn, claims the priority benefit of U.S. provisional application No. 63/030,612 filed May 27, 2020. Each of the aforementioned applications is incorporated herein by reference in its entirety.

BACKGROUND

The present disclosure relates to laminated polyolefin-based film structures, and more particularly, to laminated polyolefin-based film structures comprising two or more polyolefin-based film ply layers laminated to each other. Each of the laminated films comprises one or more polyolefin-based film layers. The film structure has an energy-cured coating layer disposed on the outermost outward facing surface of the film structure and a printed ink layer on an interior surface of one of the polyolefin-based film layers. The film structures in accordance with this disclosure may advantageously be adapted to provide a recyclable polyolefin-based film structure for flexible film packaging. In certain embodiments, the film structures herein are polyethylene-based film structures. In certain embodiments, the film structures herein are polypropylene-based film structures.

The film structures disclosed herein may advantageously be used as flexible packaging films that are formed into packages, e.g. pouches, bags, overwraps, and the like, that protect consumable products from spoiling or prematurely degrading in various environments throughout the distribution and point of sale channels. Such packaging structures may be used for packaging of food items, liquids, chemicals, health and beauty products, pharmaceutical products, or other consumable product that needs to be protected from oxygen and moisture throughout the distribution channel environment.

Recyclable polyolefin-based films, such as polyethylene-based films and polypropylene-based films, are far less resistant to mechanical and energy forces when run on a packaging filling line due to the tensions and heating bars. Previous attempts to run these materials have been met with inferior quality packages, such as ink pick off or deforming. The present development overcomes this limitation by providing a recyclable film that is heat resistant with a trapped ink system. This results in the production of a package that is not deformed and lacks other defects such as ink pick off and scuffing.

Films having surface printed inks are vulnerable to the ink pick off and rubbing in more extreme environments, even where an energy-cured coating, or other coating, is applied over the surface printed inks on the same side of the web.

Films having reverse printed inks disposed between two polyolefin film webs without a coating or having and having a wet-based, ambient, or heated air-dried coating are generally known. However, such films lack a sufficient degree of heat resistance to protect the integrity of the ink layer as well as the overall package structure from the heat associated with package forming and filling equipment, such as hot sealing bars.

The present disclosure provides an improved film structure that overcomes the above-referenced problems and others.

SUMMARY

In one aspect, a laminated polyolefin-based film structure comprises a first film ply comprising a first layer formed of a polyolefin-based film containing at least 90% by weight polyolefin homopolymers, copolymers, or terpolymers and less than 10% by weight other polymer compositions. The first layer has a first surface and a second surface opposite the first surface. A second layer is disposed on the first surface of the first layer. The second layer comprises an energy-cured coating and defines an outermost surface of the laminated polyolefin-based film structure. A second film ply comprises a third layer formed of a polyolefin-based film containing at least 90% by weight polyolefin homopolymers, copolymers, or terpolymers and less than 10% by weight other polymer compositions, the third layer having a first surface and a second surface opposite the first surface, the second surface of the third layer defining an innermost surface of the laminated polyolefin-based film structure. An adhesive layer is interposed between the first film ply and the second film ply and laminates the first film ply to the second film ply. The first surface of the third layer faces the second surface of the first layer and a printed layer is disposed intermediate the first layer and the third layer.

In a more limited aspect, a melting temperature of the outermost surface of the laminated polyolefin-based film structure is at least 100 degrees Celsius higher than a melting temperature of the innermost surface of the laminated polyolefin-based film structure.

In another more limited aspect, the melting temperature of the outermost surface of the laminated polyolefin-based film structure is at least 180 degrees Celsius higher than a melting temperature of the innermost surface of the laminated polyolefin-based film structure.

In another more limited aspect, the first layer and third layer are formed of a material selected from the group consisting of polyethylene-based films which contain at least 90% by weight polyethylene homopolymers, copolymers, or terpolymers and less than 10% by weight other polymer compositions, polypropylene-based films which contains at least 90% by weight polypropylene homopolymers, copolymers, or terpolymers and less than 10% by weight other polymer compositions, and combinations thereof.

In another more limited aspect, the first layer is formed of a polyethylene-based film which contains at least 90% by weight polyethylene homopolymers, copolymers, or terpolymers and less than 10% by weight other polymer compositions and the third layer is formed of a polyethylene-based film which contains at least 90% by weight polyethylene homopolymers, copolymers, or terpolymers and less than 10% by weight other polymer compositions.

In another more limited aspect, the first layer is formed of a polyethylene-based films which contain at least 95% by weight polyethylene homopolymers, copolymers, or terpolymers and less than 5% by weight other polymer compositions and the third layer is formed of a polyethylene-based film which contains at least 95% by weight polyethylene homopolymers, copolymers, or terpolymers and less than 5% by weight other polymer compositions.

In another more limited aspect, the printed layer comprises a reverse printed ink layer disposed on the second surface of the first layer.

In another more limited aspect, the printed layer comprises a forward printed ink layer disposed on the first surface of the third layer.

In another more limited aspect, the polyolefin-based film of the first layer and the polyolefin-based film of the third layer comprise recyclable polyolefin polymers.

In another aspect, a laminated polyolefin-based film structure comprises a first film ply comprising a first layer formed of a polyolefin-based film containing at least 90% by weight polyolefin homopolymers, copolymers, or terpolymers and less than 10% by weight other polymer compositions. The first layer has a first surface and a second surface opposite the first surface. A second layer is disposed on the first surface of the first layer, the second layer comprising an energy-cured coating. A second film ply comprises a third layer formed of a polyolefin-based film containing at least 90% by weight polyolefin homopolymers, copolymers, or terpolymers and less than 10% by weight other polymer compositions. The third layer has a first surface and a second surface opposite the first surface. A third film ply is interposed between the first film ply and the second film ply. The third film ply comprises a fourth layer formed of a polyolefin-based film containing at least 90% by weight polyolefin homopolymers, copolymers, or terpolymers and less than 10% by weight other polymer compositions. The fourth layer has a first surface and a second surface opposite the first surface. A first adhesive layer is interposed between the first film ply and the third film ply, the first adhesive layer laminating the first film ply to the third film ply, wherein the first surface of the fourth layer faces the second surface of the first layer. A second adhesive layer is interposed between the third film ply and the second film ply, the second adhesive layer laminating the third film ply to the second film ply, wherein the first surface of the third layer faces the second surface of the fourth layer. A printed layer is disposed intermediate the first layer and the third layer.

In more limited aspect, a melting temperature of the outermost surface of the laminated polyolefin-based film structure is at least 100 degrees Celsius higher than a melting temperature of the innermost surface of the laminated polyolefin-based film structure.

In another more limited aspect, a melting temperature of the outermost surface of the laminated polyolefin-based film structure is at least 180 degrees Celsius higher than a melting temperature of the innermost surface of the laminated polyolefin-based film structure.

In another more limited aspect, the first layer, third layer, and fourth layer are formed of a material selected from the group consisting of polyethylene-based films which contain at least 90% by weight polyethylene homopolymers, copolymers, or terpolymers and less than 10% by weight other polymer compositions, polypropylene-based films which contains at least 90% by weight polypropylene homopolymers, copolymers, or terpolymers and less than 10% by weight other polymer compositions, and combinations thereof.

In another more limited aspect, the first layer is formed of a polyethylene-based film which contains at least 90% by weight polyethylene homopolymers, copolymers, or terpolymers and less than 10% by weight other polymer compositions, the third layer is formed of a polyethylene-based film which contains at least 90% by weight polyethylene homopolymers, copolymers, or terpolymers and less than 10% by weight other polymer compositions, and the fourth layer is formed of a polyethylene-based polymer composition which contains at least 90% by weight polyethylene homopolymers, copolymers, or terpolymers and less than 10% by weight other polymer compositions.

In another more limited aspect, the first layer is formed of a polyethylene-based films which contain at least 95% by weight polyethylene homopolymers, copolymers, or terpolymers and less than 5% by weight other polymer compositions, the third layer is formed of a polyethylene-based film which contains at least 95% by weight polyethylene homopolymers, copolymers, or terpolymers and less than 5% by weight other polymer compositions, and the fourth layer is formed of a polyethylene-based film which contains at least 95% by weight polyethylene homopolymers, copolymers, or terpolymers and less than 5% by weight other polymer compositions.

In another more limited aspect, the printed layer comprises a reverse printed ink layer disposed on the second surface of the first layer.

In another more limited aspect, the printed layer comprises a forward printed ink layer disposed on the first surface of the fourth layer.

In another more limited aspect, the printed layer comprises one of a reverse printed ink layer disposed on the second surface of the fourth layer and a forward printed ink layer disposed on the first surface of the third layer.

In another more limited aspect, the polyolefin-based film of the first layer, the polyolefin-based film of the third layer, and the polyolefin-based film of the fourth layer are recyclable polyolefin-based films.

In another more limited aspect, the laminated polyolefin-based film structure of further comprises a fourth film ply interposed between the third film ply and the second film ply, the fourth film ply comprising a fifth layer formed of a polyolefin-based film, the fifth layer having a first surface and a second surface opposite the first surface. A third adhesive layer is interposed between the fourth film ply and the second film ply, the third adhesive layer laminating the fourth film ply to the second film ply, wherein the first surface of the third layer faces the second surface of the fifth layer.

One advantage of the present development is that the laminated polyolefin-based film structures exhibit high heat resistance.

Another advantage of the present development resides in its utility in the manufacture of film-based packaging. The presently disclosed film structure advantageously protects or maintains the integrity of the overall film structure from warping, burning, premature melting, or producing other aesthetically undesirable defects during the product filling and distribution process. By reverse printing, or alternately by providing a trapped forward printed ink layer, the inks are protected from rubbing or being picked off when the package goes through abrasive environments. The inks are also protected from the hot sealing bars common on package filling lines.

Another advantage resides in its ability to provide a multi-web recyclable polyolefin-based film package.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings, which are not to scale, are only for purposes of illustrating preferred embodiments and are not to be construed as limiting the invention.

FIG. 8 illustrates an exemplary polyolefin-based film.

FIGS. 9 and 10 illustrate exemplary multilayer polyolefin-based film structures.

DETAILED DESCRIPTION OF THE PREFERRED EMBODIMENTS

Figure 1:
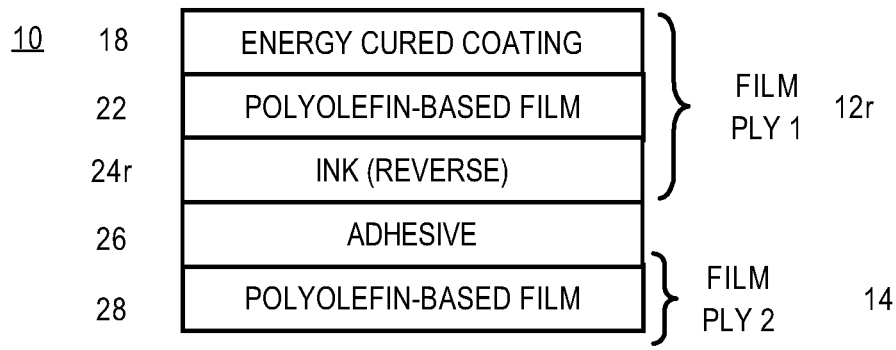
FIG. 1 is a side cross sectional view of a first embodiment of a laminated film structure comprising two polyolefin-based films laminated together.

Detailed embodiments of the present development are disclosed herein; however, it is to be understood that the disclosed embodiments are merely exemplary of the invention, which may be embodied in various forms. Therefore, specific structural and functional details disclosed herein are not to be interpreted as limiting but merely as a basis for the claims and as a representative basis for teaching one skilled in the art to variously employ the present inventive concept in virtually any appropriately detailed structure. Further, the terms and phrases used herein are not intended to be limiting but rather to provide an understandable description of the present development.

The terms "a" or "an," as used herein, are defined as one or more than one. The term "another," as used herein, is defined as at least a second or more. The terms "including" and/or "having" as used herein, are defined as comprising (i.e., open transition). The term "coupled" or "operatively coupled," as used herein, is defined as indirectly or directly connected.

The present development relates to laminated polyolefin-based film structures comprising two or more polyolefin-based films laminated together.

In certain embodiments, the present development relates to laminated polyethylene-based film structures comprising two or more polyethylene-based films laminated together.

In certain embodiments, the present development relates to laminated polypropylene-based film structures comprising two or more polypropylene-based films laminated together.

As used herein, the term "polyolefin-based film" refers to a film which contains at least 90% by weight polyolefin polymers and less than 10% by weight other polymer materials. The term "polyolefin polymer" includes polyolefin homopolymers, copolymers, terpolymers, or combinations thereof. In certain more limited embodiments, the polyolefin-based films herein contain at least 95% by weight polyolefin polymers and less than 5% by weight other polymer materials.

As used herein, the term "polyethylene-based film" refers to a film which contains at least 90% by weight polyethylene polymers and less than 10% by weight other polymer materials. The term "polyethylene polymer" includes polyethylene homopolymers, copolymers, terpolymers, or combinations thereof. In certain more limited embodiments, the polyethylene-based films herein contain at least 95% by weight polyethylene-based polymers and less than 5% by weight other polymer materials.

As used herein, the term "polypropylene-based film" refers to a film which contains at least 90% by weight polypropylene polymers and less than 10% by weight other polymer materials. The term "polypropylene polymer" includes polypropylene homopolymers, copolymers, terpolymers, or combinations thereof. In certain more limited embodiments, the polypropylene-based films herein contain at least 95% by weight polypropylene-based polymers and less than 5% by weight other polymer materials.

Referring now to the drawings, FIGS. 1-7 illustrate exemplary polyolefin-based packaging film structures manufactured in accordance with exemplary embodiments of the present invention. The packaging film structures illustrated have enhanced heat resistance properties.

Referring now to FIG. 1, there appears a first embodiment packaging film structure 10 which includes a first film ply 12r laminated to a second film ply 14. The first film ply 12r is an outer film and the second film ply is an inner film. An adhesive layer 26 is interposed between the first film ply 12r and the second film ply 14 to form a laminated structure. The adhesive layer 26 may be formed of any suitable adhesive, including single component adhesives, two component adhesives, solvent-based adhesives, solventless adhesives, water-based adhesives, acrylic adhesives, extruded polyethylene or polypropylene adhesive systems, electron beam lamination adhesives, and UV lamination adhesives, as would be understood by persons skilled in the art.

The first film ply 12r is formed on an outer portion of the packaging film structure 10. The film 12r includes a polyolefin-based film 22, which may be a monolayer or multilayer structure. Exemplary polyolefin polymers forming the polyolefin-based film 22 include, for example, homopolymers, copolymers, and terpolymers of ethylene, high density polyethylene (HDPE), medium density polyethylene (MDPE), linear medium density polyethylene (LMDPE), low density polyethylene (LDPE), linear low density polyethylene (LLDPE), very low density polyethylene (VLDPE), metallocene linear low-density polyethylene (mLLDPE), and homopolymers, copolymers, and terpolymers of polypropylene.

The first film ply 12r further includes an energy-cured coating 18 formed on a first surface of the polyolefin-based film 22 and forms an outermost portion of the film structure 10. The energy-cured coating 18 refers to a coating of one or more reactive monomer, oligomer, or polymer compositions, which is irreversibly converted into a solid polymer coating via reactive groups in the reactive monomer, oligomer, or polymer compositions upon the application of energy from a suitable energy source, such as irradiation with electron beams or irradiation with electromagnetic radiation, such as ultraviolet (UV) light or thermal radiation (heat).

In certain embodiments, the energy-cured coating 18 is applied over the entire first surface of the film 22. In certain embodiments, the energy-cured coating 18 is applied over a portion of the entire first surface of the film 22. In certain embodiments, the energy-cured coating 18 is applied as a continuous coating over the entire first surface of the film 22. In certain embodiments, the energy-cured coating 18 is applied as a continuous coating over a portion of the first surface of the film 22. In certain embodiments, the energy-cured coating 18 is applied as a discontinuous coating, e.g., as a pattern-applied coating, over the entire first surface of the film 22. In certain embodiments, the energy-cured coating 18 is applied as a discontinuous coating, e.g., as a pattern-applied coating, over a portion of the first surface of the film 22. In certain embodiments wherein the energy-cured coating 18 is applied only to a portion of the first surface of the film 22 and/or as pattern-applied coating, the film 22 may include registration indicia, fiducial markers, or the like to allow the film 22 to be registered to ensure that the energy-cured coating 18 will be disposed at an appropriate on the film 22.

In preferred embodiments, the energy-cured coating 18 is a cured polyacrylate composition formed from by curing a reactive polymer composition comprising one or more monomers, oligomers, polymers, acrylates, polyacrylates, and/or polyacrylate copolymers. In certain embodiments, the energy-cured coating 18 is an electron beam cured composition that includes, but is not limited to, ethoxylated trimethylolpropane triacrylates, acrylated and acrylate ester resins, polyol acrylates, trimethylolpropane triacrylates, polydimethylsiloxane acrylates, and maleic anhydrides. Other energy-cured coating compositions may include monomers and oligomers that contain vinyl and allyl compounds, as well as monomers and oligomers that are induced into UV polymerization and curing through the mediation of photoinitiators and exposure to UV light and coatings that provide enhanced oxygen and moisture barrier properties.

In certain embodiments, the energy-cured coating provides the outermost surface of the film structure with a melting temperature which is at least 100 degrees Celsius higher than the melting temperature of the innermost surface of the film structure, wherein the "melting temperature" as used herein is the refers to the temperature at which by a heat seal formed a cohesive strength of at least one pound per inch of seal width when subjecting the surfaces to a sealing pressure of 40 pounds per square inch and a sealing dwell time of 0.5 seconds. In certain embodiments, the energy-cured coating provides the outermost surface of the film structure with a melting temperature which is at least 120 degrees Celsius higher than the melting temperature of the innermost surface of the film structure. In certain embodiments, the energy-cured coating provides the outermost surface of the film structure with a melting temperature which is at least 160 degrees Celsius higher than the melting temperature of the innermost surface of the film structure. In certain embodiments, the energy-cured coating provides the outermost surface of the film structure with a melting temperature which is at least 180 degrees Celsius higher than the melting temperature of the innermost surface of the film structure.

In certain embodiments, the energy-cured coating 18 has a coating thickness in the range of from about 0.78 micron (0.03 mil) to about 8 microns (0.31 mil), preferably from about 2.3 microns (0.091 mil) to about 4.7 micron (0.19 mil). In certain embodiments the energy-cured coating 18 has a density in the range of from about 0.85 g/cc to about 1.25 g/cc, preferably from about 1.02 to about 1.06 g/cc, and most preferably about 1.04 g/cc. In certain embodiments, the energy-cured coating 18 has a coating weight in the range of from about 0.5 lb/ream (0.81 g/m$^2$) to about 5.0 lb/ream (8.14 g/m$^2$), preferably of from about 1.5 lb/ream (2.44 g/m$^2$) to about 3.0 lb/ream (4.88 g/m$^2$).

A printing ink layer 24r is disposed on a second, inward facing surface of the polyolefin-based film 22, the second surface opposite the first surface. The printing ink layer 24r provides printed indicia intended to appear on a packaging structure formed from the film structure 10. Because the printing ink layer 24r is applied to the inward facing surface of the polyolefin-based film 22, the printed material is effected in a reverse printed format. The printing ink layer 24r can be applied to the second surface of the polyolefin-based film 22 via any conventional printing method as would be understood by persons skilled in the art, including without limitation, using a rotogravure printing apparatus or flexographic printing apparatus.

The second film ply 14 includes a polyolefin-based film 28 formed on an innermost portion of the film structure 10. The polyolefin-based film 28 defines a sealant layer and may comprise any polyolefin polymer suitable for providing a hermetic seal in a finished packaging article, and preferably has a low seal initiation temperature/melting temperature. The polyolefin-based film 28 may be a monolayer or multilayer structure. Exemplary polyolefin polymers forming the polyolefin-based film 28 include, for example, homopolymers, copolymers, and terpolymers of ethylene, high density polyethylene (HDPE), medium density polyethylene (MDPE), linear medium density polyethylene (LMDPE), low density polyethylene (LDPE), linear low density polyethylene (LLDPE), very low density polyethylene (VLDPE), metallocene linear low-density polyethylene (mLLDPE), and homopolymers, copolymers, and terpolymers of polypropylene.

Figure 2:
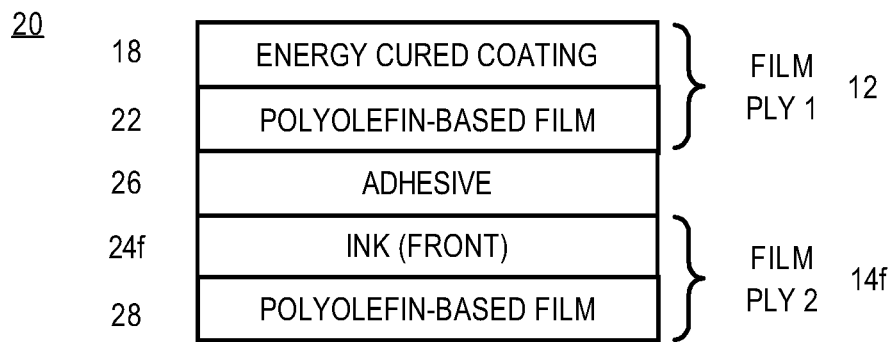
FIG. 2 is a side cross sectional view of a second embodiment of a laminated film structure comprising two polyolefin-based films laminated together.

Referring now to FIG. 2, there appears a second embodiment packaging film structure 20 which includes a first film ply 12 laminated to a second film ply 14f. The first film ply 12 is an outer film and the second film ply is an inner film. An adhesive layer 26 is interposed between the first film ply 12 and the second film ply 14f to form a laminated structure. The adhesive layer 26 may be formed of an adhesive material as described above by way of reference to FIG. 1.

The first film ply 12 is formed on an outer portion of the packaging film structure 20. The first film ply 12 includes a polyolefin-based film 22, which may be a monolayer or multilayer structure and may be formed of a polyolefin-based film as described above by way of reference to FIG. 1.

The first film ply 12 further includes an energy-cured coating 18 formed on a first surface of the polyolefin-based film 22 and forms an outermost portion of the film structure 20. The energy-cured coating 18 may be formed of a material and applied as described above by way of reference to FIG. 1. In preferred embodiments, the energy-cured coating 18 is a cured polyacrylate composition formed from by curing a reactive polymer composition comprising one or more polyacrylates and/or polyacrylate copolymers. In certain embodiments, the energy-cured coating 18 is an electron beam cured polyacrylate composition.

The second film ply 14f includes a polyolefin-based film 28 and is formed on an innermost portion of the film structure 20. The polyolefin-based film 28 defines a sealant layer and may comprise any polyolefin polymer suitable for providing a hermetic seal in a finished packaging article, and preferably has a low seal initiation temperature/melting temperature. The polyolefin-based film 28, which may be a monolayer or multilayer structure, may comprise a polyolefin polymer material as described above by way of reference to FIG. 1. In certain embodiments, the polyolefin-based film 28 is formed of low density polyethylene (LDPE) or linear low density polyethylene (LLDPE).

The second film ply 14*f* further includes a printing ink layer 24*f* disposed on a first, outward facing surface of the polyolefin-based film 22. The printing ink layer 24*f* provides printed indicia intended to appear on a packaging structure formed from the film structure 20. Because the printing ink layer 24*f* is applied to the outward facing surface of the polyolefin-based film 22, the printed material is effected in a front printed format. The printing ink layer 24*f* can be applied to the first surface of the polyolefin-based film 22 via any conventional printing method as would be understood by persons skilled in the art, including without limitation, using a rotogravure printing apparatus or flexographic printing apparatus.

Figure 3:
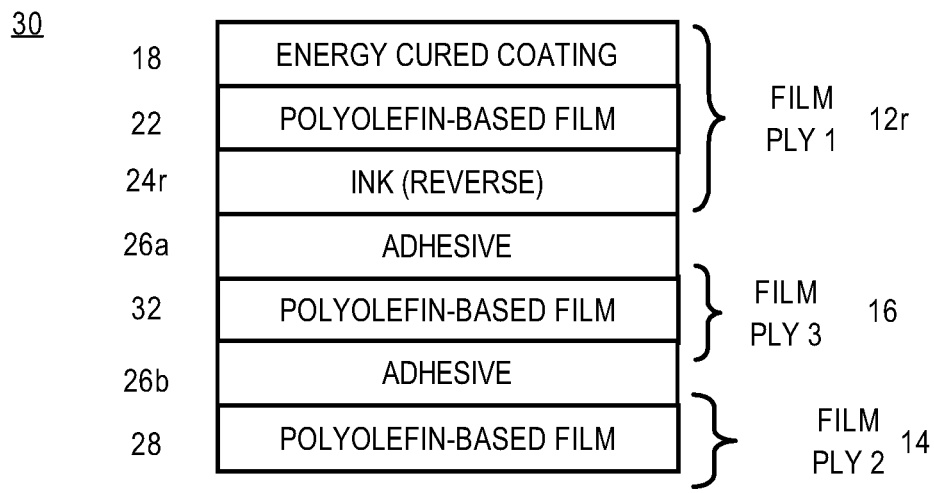
FIG. 3 is a side cross sectional view of a first embodiment of a laminated film structure comprising three polyolefin-based films laminated together.

Referring now to FIG. 3, there appears a third embodiment packaging film structure 30, comprising a first film ply 12*r*, a third film ply 16, and a second film ply 14, which are laminated together. The first film ply 12*r* is an outer film, the second film ply is an inner film, and the third film ply is an intermediate film. A first adhesive layer 26*a* is interposed between the first film ply 12*r* and the third film ply 16 and a second adhesive layer 26*b* is interposed between the third film ply 16 and the second film ply 14, to form a laminated structure. The adhesive layers 26*a* and 26*b* may be formed of an adhesive material as described above by way of reference to FIG. 1.

The first film ply 12*r* is formed on an outer portion of the packaging film structure 30. The film 12*r* includes a polyolefin-based film 22, which may be a monolayer or structure, and may comprise a polyolefin polymer material as described above by way of reference to FIG. 1.

The first film ply 12*r* further includes an energy-cured coating 18 formed on a first surface of the polyolefin-based film 22 and forms an outermost portion of the film structure 30. The energy-cured coating 18 may be formed of a material and applied as described above by way of reference to FIG. 1. In preferred embodiments, the energy-cured coating 18 is a cured polyacrylate composition formed from by curing a reactive polymer composition comprising one or more polyacrylates and/or polyacrylate copolymers. In certain embodiments, the energy-cured coating 18 is an electron beam cured polyacrylate composition.

A printing ink layer 24*r* is disposed on a second, inward facing surface of the polyolefin-based film 22, opposite the first surface. The printing ink layer 24*r* provides printed indicia intended to appear on a packaging structure formed from the film structure 30. Because the printing ink layer 24*r* is applied to the inward facing surface of the polyolefin-based film 22, the printed material is effected in a reverse printed format. The printing ink layer 24*r* can be applied to the second surface of the polyolefin-based film 22 via any conventional printing method as would be understood by persons skilled in the art, including without limitation, using a rotogravure printing apparatus or flexographic printing apparatus.

The second film ply 14 includes a polyolefin-based film 28 and is formed on an innermost portion of the film structure 30. The polyolefin-based film 28 defines a sealant layer and may comprise any polyolefin polymer suitable for providing a hermetic seal in a finished packaging article, and preferably has a low seal initiation temperature/melting temperature. The polyolefin-based film 28, which may be a monolayer or multilayer structure, may comprise a polyolefin polymer material as described above by way of reference to FIG. 1. In certain embodiments, the polyolefin-based film 28 is formed of low density polyethylene (LDPE) or linear low density polyethylene (LLDPE).

The third film ply 16 is interposed between the first film ply 12*r* and the second film ply 14. The third film ply 16 includes a polyolefin-based film 32, which may be a monolayer or multilayer structure. The polyolefin-based film 32 may be a monolayer or multilayer structure. Exemplary polyolefin polymers for forming the polyolefin-based film 32 include, for example, homopolymers, copolymers, and terpolymers of ethylene, high density polyethylene (HDPE), medium density polyethylene (MDPE), linear medium density polyethylene (LMDPE), low density polyethylene (LDPE), linear low density polyethylene (LLDPE), very low density polyethylene (VLDPE), metallocene linear low-density polyethylene (mLLDPE), and homopolymers, copolymers, and terpolymers of polypropylene.

Figure 4:
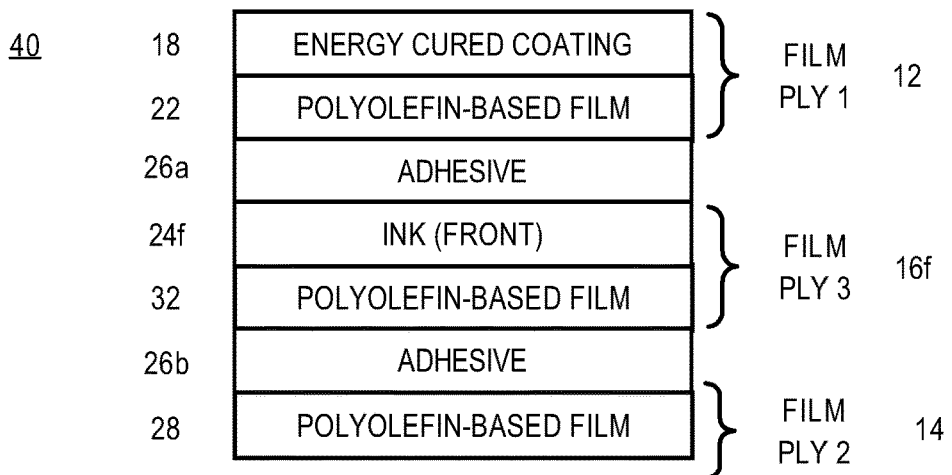
FIG. 4 is a side cross sectional view of a second embodiment of a laminated film structure comprising three polyolefin-based films laminated together.

Referring now to FIG. 4, there appears a fourth embodiment packaging film structure 40, comprising a first film ply 12, a third film ply 16*f*, and a second film ply 14, which are laminated together. The first film ply 12 is an outer film, the second film ply is an inner film, and the third film ply is an intermediate film. A first adhesive layer 26*a* is interposed between the first film ply 12 and the third film ply 16*f* and a second adhesive layer 26*b* is interposed between the third film ply 16*f* and the second film ply 14, to form a laminated structure. The adhesive layers 26*a* and 26*b* may be formed of an adhesive material as described above by way of reference to FIG. 1.

The first film ply 12 is formed on an outer portion of the packaging film structure 40. The film 12 includes a polyolefin-based film 22, which may be a monolayer or multilayer structure and which may comprise a polyolefin polymer as described above by way of reference to FIG. 1.

The first film ply 12 further includes an energy-cured coating 18 formed on a first surface of the polyolefin-based film 22 and forms an outermost portion of the film structure 40. The energy-cured coating 18 may be formed of a material and applied as described above by way of reference to FIG. 1. In preferred embodiments, the energy-cured coating 18 is a cured polyacrylate composition formed from by curing a reactive polymer composition comprising one or more polyacrylates and/or polyacrylate copolymers. In certain embodiments, the energy-cured coating 18 is an electron beam cured polyacrylate composition.

The second film ply 14 includes a polyolefin-based film 28 and is formed on an innermost portion of the film structure 40. The polyolefin-based film 28 defines a sealant layer and may comprise any polyolefin polymer suitable for providing a hermetic seal in a finished packaging article, and preferably has a low seal initiation temperature/melting temperature. The polyolefin-based film 28, which may be a monolayer or multilayer structure, may be formed of a polyolefin polymer material as described above by way of reference to FIG. 1. In certain embodiments, the polyolefin-based film 28 is formed of low density polyethylene (LDPE) or linear low density polyethylene (LLDPE).

The third film ply 16*f* is interposed between the first film ply 12 and the second film ply 14. The third film ply 16*f* includes a polyolefin-based film 32, which may be a monolayer or multilayer structure. The polyolefin-based film 32 may comprise a polyolefin polymer material as described above by way of reference to FIG. 3.

The third film ply 16*f* further includes a printing ink layer 24*f* disposed on a first, outward facing surface of the polyolefin-based film 32. The printing ink layer 24*f* provides printed indicia intended to appear on a packaging structure formed from the film structure 40. Because the printing ink layer 24*f* is applied to the outward facing surface of the polyolefin-based film 32, the printed material is effected in a front printed format. The printing ink layer 24*f* can be applied to the first surface of the polyolefin-based film 32 via any conventional printing method as would be understood by persons skilled in the art, including without limitation, using a rotogravure printing apparatus or flexographic printing apparatus.

Figure 5:
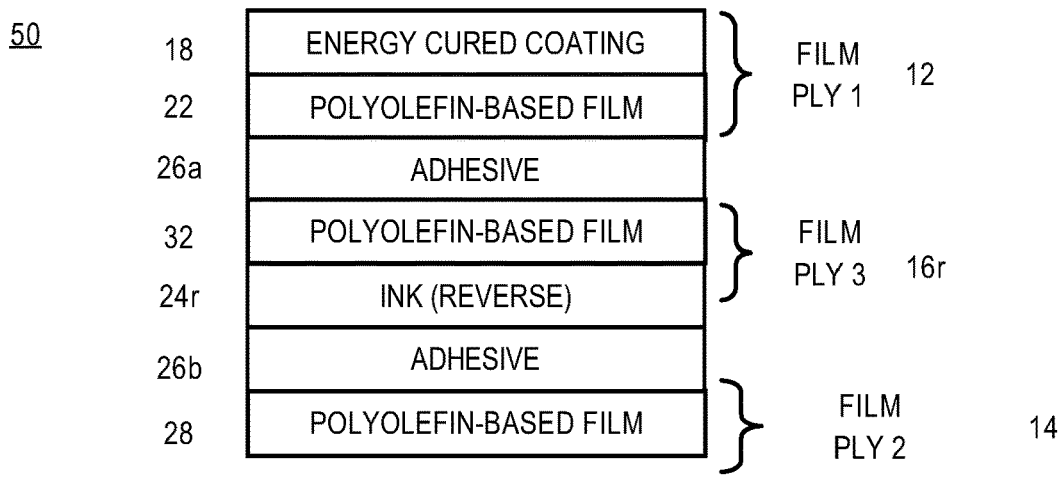
FIG. 5 is a side cross sectional view of a third embodiment of a laminated film structure comprising three polyolefin-based films laminated together.

Referring now to FIG. 5, there appears a fifth embodiment packaging film structure 50 comprising a first film ply 12, a third film ply 16*r*, and a second film ply 14, which are laminated together. The first film ply 12 is an outer film, the second film ply is an inner film, and the third film ply is an intermediate film. A first adhesive layer 26*a* is interposed between the first film ply 12 and the third film ply 16*r* and a second adhesive layer 26*b* is interposed between the third film ply 16*r* and the second film ply 14, to form a laminated structure. The adhesive layers 26*a* and 26*b* may be formed of an adhesive material as described above by way of reference to FIG. 1.

The first film ply 12 is formed on an outer portion of the packaging film structure 50. The film 12 includes a polyolefin-based film 22, which may be a monolayer or multilayer structure, and may be formed of a polyolefin polymer material as described above by way of reference to FIG. 1.

The first film ply 12 further includes an energy-cured coating 18 formed on a first surface of the polyolefin-based film 22 and forms an outermost portion of the film structure 50. The energy-cured coating 18 may be formed of a material and applied as described above by way of reference to FIG. 1. In preferred embodiments, the energy-cured coating 18 is a cured polyacrylate composition formed from by curing a reactive polymer composition comprising one or more polyacrylates and/or polyacrylate copolymers. In certain embodiments, the energy-cured coating 18 is an electron beam cured polyacrylate composition.

The second film ply 14 includes a polyolefin-based film 28 and is formed on an innermost portion of the film structure 50. The polyolefin-based film 28 defines a sealant layer and comprise any polyolefin polymer suitable for providing a hermetic seal in a finished packaging article, and preferably has a low seal initiation temperature/melting temperature. The polyolefin-based film 28, which may be a monolayer or multilayer structure, may be formed of a polyolefin polymer material as described above by way of reference to FIG. 1. In certain embodiments, the polyolefin-based film 28 is formed of low density polyethylene (LDPE) or linear low density polyethylene (LLDPE).

The third film ply 16*r* is interposed between the first film ply 12 and the second film ply 14. The third film ply 16*r* includes a polyolefin-based film 32, which may be a monolayer or multilayer structure. The polyolefin-based film 32 may comprise a polyolefin polymer material as described above by way of reference to FIG. 3.

The third film ply 16*r* further includes a printing ink layer 24*r* disposed on an inward facing surface of the polyolefin-based film 32. The printing ink layer 24*r* provides printed indicia intended to appear on a packaging structure formed from the film structure 50. Because the printing ink layer 24*r* is applied to the inward facing surface of the polyolefin-based film 32, the printed material is effected in a reverse printed format. The printing ink layer 24*r* can be applied to the inward facing surface of the polyolefin-based film 32 via any conventional printing method as would be understood by persons skilled in the art, including without limitation, using a rotogravure printing apparatus or flexographic printing apparatus.

Figure 6:
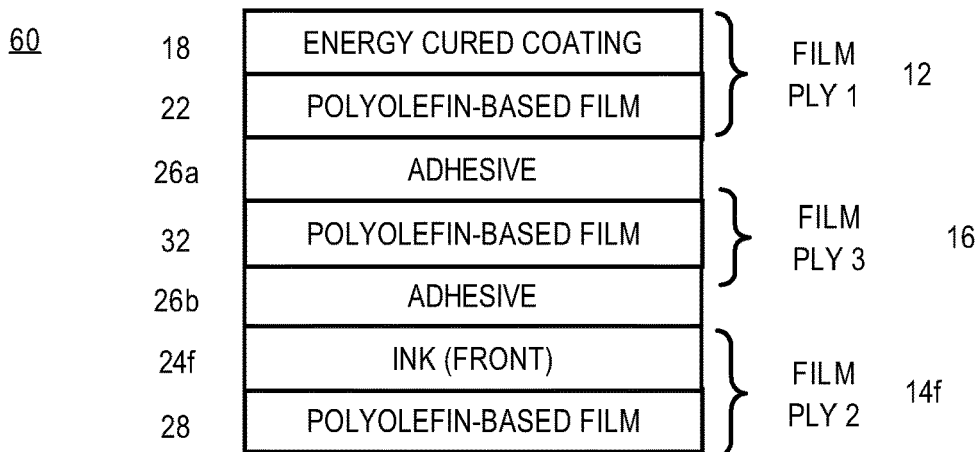
FIG. 6 is a side cross sectional view of a fourth embodiment of a laminated film structure comprising three polyolefin-based films laminated together.

Referring now to FIG. 6, there appears a sixth embodiment packaging film structure 60, comprising a first film ply 12, a third film ply 16, and a second film ply 14*f*, which are laminated together. The first film ply 12 is an outer film, the second film ply is an inner film, and the third film ply is an intermediate film. A first adhesive layer 26*a* is interposed between the first film ply 12 and the third film ply 16 and a second adhesive layer 26*b* is interposed between the third film ply 16 and the second film ply 14*f*, to form a laminated structure. The adhesive layers 26*a* and 26*b* may be formed of an adhesive material as described above by way of reference to FIG. 1.

The first film ply 12 is formed on an outer portion of the packaging film structure 60. The film 12 includes a polyolefin-based film 22, which may be a monolayer or multilayer structure, and may be formed of a polyolefin polymer material as described above by way of reference to FIG. 1.

The first film ply 12 further includes an energy-cured coating 18 formed on a first surface of the polyolefin-based film 22 and forms an outermost portion of the film structure 60. The energy-cured coating 18 may be formed of a material and applied as described above by way of reference to FIG. 1. In preferred embodiments, the energy-cured coating 18 is a cured polyacrylate composition formed from by curing a reactive polymer composition comprising one or more polyacrylates and/or polyacrylate copolymers. In certain embodiments, the energy-cured coating 18 is an electron beam cured polyacrylate composition.

The second film ply 14*f* includes a polyolefin-based film 28 and is formed on an innermost portion of the film structure 60. The polyolefin-based film 28 defines a sealant layer and may comprise any polyolefin polymer suitable for providing a hermetic seal in a finished packaging article, and preferably has a low seal initiation temperature/melting temperature. The polyolefin-based film 28, which may be a monolayer or multilayer structure, may be formed of a polyolefin polymer material as described above by way of reference to FIG. 1. In certain embodiments, the polyolefin-based film 28 is formed of low density polyethylene (LDPE) or linear low density polyethylene (LLDPE).

The third film ply 16 is interposed between the first film ply 12 and the second film ply 14*f*. The third film ply 16 includes a polyolefin-based film 32, which may be a monolayer or multilayer structure. The polyolefin-based film 32 may comprise a polyolefin polymer material as described above by way of reference to FIG. 3.

A printing ink layer 24*f* is disposed on an outward facing surface of the polyolefin-based film 32, opposite the innermost surface. The printing ink layer 24*f* provides printed indicia intended to appear on a packaging structure formed from the film structure 60. Because the printing ink layer 24*f* is applied to the outward facing surface of the polyolefin-based film 32, the printed material is effected in a front printed format. The printing ink layer 24*f* can be applied to the outward facing surface of the polyolefin-based film 32 via any conventional printing method as would be understood by persons skilled in the art, including without limitation, using a rotogravure printing apparatus or flexographic printing apparatus.

Figure 7:
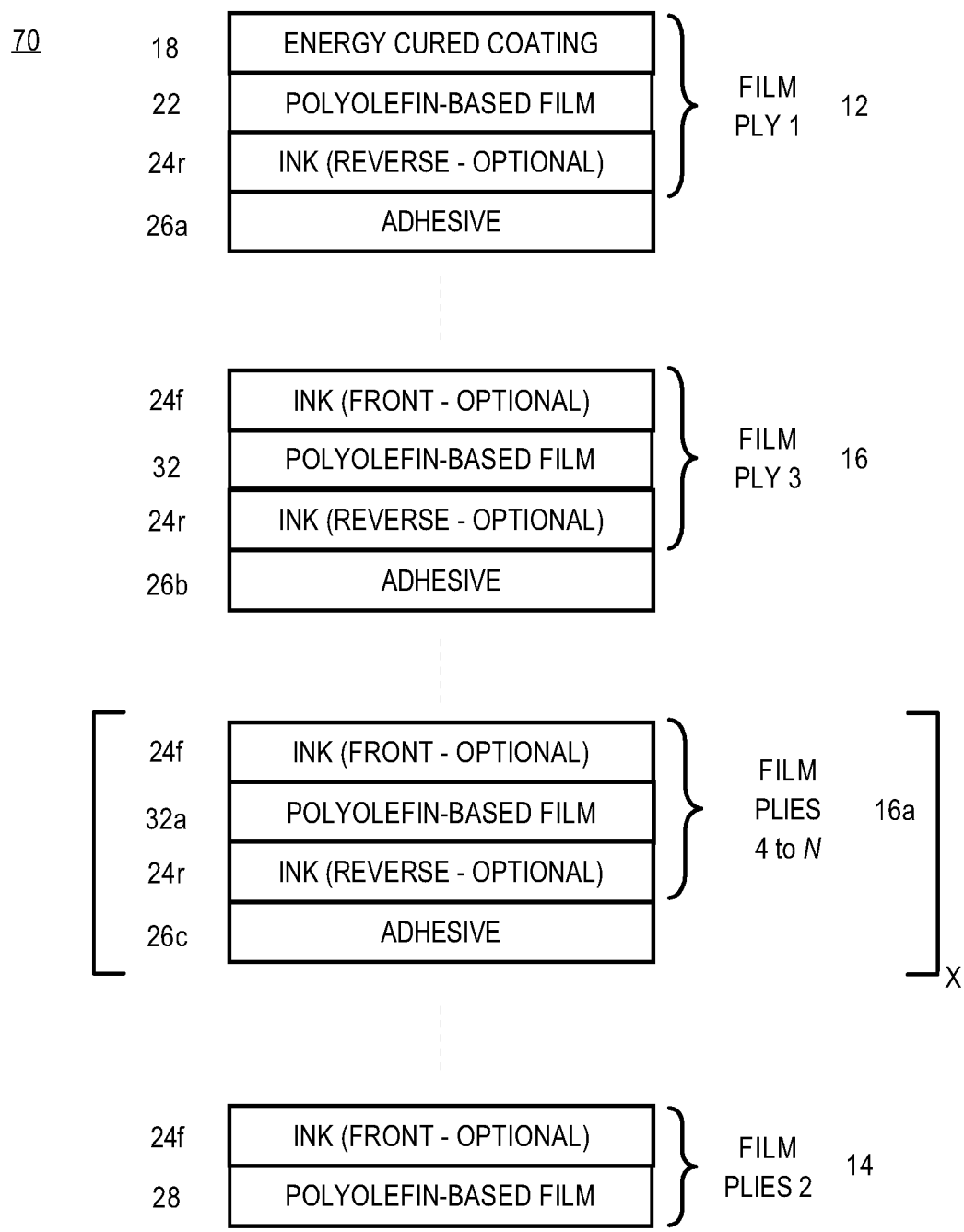
FIG. 7 is a side cross-sectional view of a fifth embodiment of a laminated film structure comprising four or more polyolefin-based films laminated together.

Referring now to FIG. 7, there appears a sixth embodiment packaging film structure 70, comprising a first film ply 12, a third film ply 16, a second film ply 14, and one or more (up to "X") film plies 4 through N, designated 16*a*, where X is 1, 2, 3, 4, 5, 6, 7, 8, 9, or more, and N is 4, 5, 6, 7, 8, 9, 10, 11, 12, or more, which are laminated together. The first film ply 12 is an outer film, the second film ply is an inner film, and the third film ply is an intermediate film. A first adhesive layer 26a is interposed between the first film ply 12 and the third film ply 16 and a second adhesive layer 26b is interposed between the third film ply 16 and the fourth film ply 16a, and further adhesive layers 26c are disposed between the fourth and subsequent film plies 16a and the second film ply 14 to form a laminated structure. The adhesive layers 26a, 26b, and 26c may be formed of an adhesive material as described above by way of reference to FIG. 1.

The first film ply 12 is formed on an outer portion of the packaging film structure 70. The film 12 includes a polyolefin-based film 22, which may be a monolayer or multilayer structure, and may comprise a polyolefin polymer material as described above by way of reference to FIG. 1.

The first film ply 12 further includes an energy-cured coating 18 formed on a first surface of the polyolefin-based film 22 and forms an outermost portion of the film structure 70. The energy-cured coating 18 may be formed of a material and applied as described above by way of reference to FIG. 1. In preferred embodiments, the energy-cured coating 18 is a cured polyacrylate composition formed from by curing a reactive polymer composition comprising one or more polyacrylates and/or polyacrylate copolymers. In certain embodiments, the energy-cured coating 18 is an electron beam cured polyacrylate composition.

The second film ply 14 includes a polyolefin-based film 28 and is formed on an innermost portion of the film structure 70. The polyolefin-based film 28 defines a sealant layer and may be any polyolefin polymer suitable for providing a hermetic seal in a finished packaging article, and preferably has a low seal initiation temperature/melting temperature. The polyolefin-based film 28, which may be a monolayer or multilayer structure, may be formed of a polyolefin polymer material as described above by way of reference to FIG. 1. In certain embodiments, the polyolefin-based film 28 is formed of low density polyethylene (LDPE) or linear low density polyethylene (LLDPE).

The third film ply 16 is interposed between the first film ply 12 and the one or more film plies 16a. The third film ply 16 includes a polyolefin-based film 32, which may be a monolayer or multilayer structure. The polyolefin-based film 32 may comprise a polyolefin polymer material as described above by way of reference to FIG. 3.

The film plie(s) 4 through N 16a are interposed between the third film ply 16 and the second film ply layer 14. The fourth film ply layer(s) 16a include a polyolefin-based film 32a, which may be a monolayer or multilayer structure. The polyolefin-based film 32a may be formed of a polyolefin polymer material as described above by way of reference to FIG. 3.

A printing ink layer 24f or 24r is disposed on an outward or inward facing surface, respectively, of a selected one of the polyolefin-based films 32, 32a, or alternatively, on the inward facing surface of the polyolefin layer 22 or the outward facing surface of the polyolefin layer 28. The printing ink layer 24f, 24r provides printed indicia intended to appear on a packaging structure formed from the film structure 70. The printed material comprising the printing ink layer is effected in a front printed format (24f) or a reverse printed format (24r), depending on whether the printing layer is applied to an outward facing surface or an inward facing surface. The printing ink layer 24f, 24r can be applied via any conventional printing method as would be understood by persons skilled in the art, including without limitation, using a rotogravure printing apparatus or flexographic printing apparatus.

One method of manufacturing a laminated film structure comprises the steps of applying a set of printing inks to one side of a recyclable polyolefin-based film web and applying an energy-cured coating to the other side of that same web to form a first film ply. The first film ply is then laminated to a second film ply comprising a recyclable polyolefin-based film web, such that the inks are sandwiched between the webs. In certain embodiments, the steps are performed in a continuous process step. Alternatively, the steps can be performed in as separate process steps.

Another method of manufacturing a laminated film structure comprises applying an energy-cured coating to the outer side of a first polyolefin-based film to form a first film ply. Printing inks are applied to the surface of a second polyolefin-based film to form a second film ply. The first and second film plies are then laminated together with an adhesive such that the printing ink layer is disposed on an interior surface of the laminate.

Yet another method of manufacturing a laminated film structure comprises applying an energy-cured coating to the outermost side of a polyolefin-based film to form an outer film ply. An intermediate film ply comprising a polyolefin-based film and an inner film ply comprising a polyolefin-based film are also provided. The innermost side of the inner film ply defines a sealant layer. A printing ink layer is applied to any one of the inward facing surface of outer film ply, either side of the intermediate film ply, or the outward facing surface of the inner film ply. The outer, intermediate, and inner film plies are then laminated together, with the intermediate film ply interposed between the outer and inner film plies. This also provides a printed ink layer sandwiched within layers while having the energy-cured coating on the outermost side of the film structure.

The present development was reduced to practice and the heat resistance was compared to recyclable polyolefin-based film having no coating or a traditional wet coating cured through ambient or heat airflow. The film structures were tested using a sealing pressure of 40 psi and a sealing dwell time of 0.5 seconds. The sealing temperature ranged from 60 degrees C. to 260 degrees C. Data showing the improved heat resistance of an energy-cured coating on a 2-ply recyclable polyethylene-based film structure in accordance with the present disclosure versus 2-ply film structures with no coating or a traditional wet coating cured through ambient or heat airflow are shown in Table 1.

TABLE 1

Film Heat Resistance Test Results
Conditions: Heat Seal @ 40 psi, 0.5 sec-(seal strength (g/in))

| Temp (° C.) | Recyclable Lam 2-Ply 100 ga PE/3 mil PE Wet Coating | Recyclable Lam 2-Ply 90 ga PE/3 mil PE No Coating | Recyclable Lam 2-Ply 90 ga PE/3 mil PE Energy-Cured Coating |
|---|---|---|---|
| 60 | Inner surface not melted Outer surface not melted | Inner surface not melted Outer surface not melted | Inner surface not melted Outer surface not melted |
| 80 | Inner surface initial melt Outer surface not melted | Inner surface initial melt Outer surface not melted | Inner surface initial melt Outer surface not melted |
| 130 | Inner surface melted Outer surface not melted | Inner surface melted Outer surface not melted | Inner surface melted Outer surface not melted |
| 135 | Inner surface melted Outer surface starting to shrink | Inner surface melted Outer surface not melted | Inner surface melted Outer surface not melted |

TABLE 1-continued

Film Heat Resistance Test Results
Conditions: Heat Seal @ 40 psi, 0.5 sec-(seal strength (g/in))

| Temp (° C.) | Recyclable Lam 2-Ply 100 ga PE/3 mil PE Wet Coating | Recyclable Lam 2-Ply 90 ga PE/3 mil PE No Coating | Recyclable Lam 2-Ply 90 ga PE/3 mil PE Energy-Cured Coating |
|---|---|---|---|
| 140 | Inner surface melted Outer melt shrink 3 mm in MD/TD | Inner surface melted Outer melted/stick to top metal jaw | Inner surface melted Outer surface not melted |
| 150 | | | Inner surface melted Outer surface not melted |
| 200 | | | Inner surface melted Outer surface not melted |
| 230 | | | Inner surface melted Outer surface not melted |
| 260 | | | Inner surface melted Outer surface not melted |

As can be seen from the data in Table 1, the film structure having the energy-cured coating in accordance with the present development was found to have a temperature differential between inner layer melting and outer layer melting of at least 180 degrees C.; whereas, the film structures without no coating or a traditional dried wet coating had a temperature differential between inner layer melting and outer layer melting of at most 60 degrees C.

As mentioned above, each of the recyclable polyolefin layers 22, 28, and 32, which may be the same or different, may comprise monolayer or multilayer structures. The recyclable polyolefin layers 22, 28, and 32 may be coextrusions, extrusion laminations, laminations, or combinations thereof. In certain embodiments, one or more of the recyclable polyolefin layers 22, 28, and 32 includes a barrier layer for preventing or reducing the transmission of oxygen or other gas molecules or moisture vapor through the film structure. FIGS. 8 and 9 illustrate exemplary polyolefin-based films 22, 28, and 32. FIG. 8 illustrates a polyolefin-based film comprising a polyolefin polymer layer 44, which is operable to embody the polyolefin-based film layers 22, 28, or 32. FIG. 9 illustrates a five-layer polyethylene-based film structure comprising a barrier layer 40 disposed between two polyolefin layers 44. Tie layers 42 are disposed intermediate the barrier layer 40 and each of the polyolefin layers 44. Exemplary tie layers include maleic anhydride (MAH) or other tie resin or adhesion promotor as would be known by persons skilled in the art. Although a 5-layer multilayer film structure is illustrated, it will be recognized that other numbers of layers, including 7 layer, 9-layer, and others are also contemplated. Exemplary barrier layers 40 include polymer barrier layers such as ethylene-vinyl alcohol (EVOH), polyvinyl alcohol (PVOH), polyamides, e.g., polyamide nylon (PA) (e.g., polyamide nylon 6 (PA6)), with or without compatibilizer additives.

Referring now to FIG. 10, in still further embodiments, each of the polyolefin-based film layers 22, 28, and 32, may comprise a monolayer or multilayer polyolefin polymer structure 44 having an organic or inorganic barrier layer 46. Exemplary barrier layers 46 include but are not limited to metal oxide coated films such as aluminum oxide (AlOx), silicon oxide (SiOx), or combinations thereof, coated film layers, and metalized film, e.g., aluminum coated film.

The invention has been described with reference to the preferred embodiment. Modifications and alterations will occur to others upon a reading and understanding of the preceding detailed description. It is intended that the invention be construed as including all such modifications and alterations insofar as they come within the scope of the appended claims or the equivalents thereof.

What is claimed is:

1. A laminated polyolefin-based film structure comprising:
   a first film ply comprising:
      a first layer formed of a polyolefin-based film containing at least 90% by weight polyolefin homopolymers, copolymers, or terpolymers and less than 10% by weight other polymer compositions, the first layer having a first surface and a second surface opposite the first surface; and
      a second layer disposed on the first surface of the first layer, the second layer comprising an energy-cured coating and defining an outermost surface of the laminated polyolefin-based film structure; and
   a second film ply comprising:
      a third layer formed of a polyolefin-based film containing at least 90% by weight polyolefin homopolymers, copolymers, or terpolymers and less than 10% by weight other polymer compositions, the third layer having a first surface and a second surface opposite the first surface, the second surface of the third layer defining an innermost surface of the laminated polyolefin-based film structure; and
   an adhesive layer interposed between the first film ply and the second film ply, the adhesive layer laminating the first film ply to the second film ply, wherein the first surface of the third layer faces the second surface of the first layer;
   wherein the polyolefin-based film of the first layer and the polyolefin-based film of the third layer comprise recyclable polyolefin polymers; and
   wherein a melting temperature of the outermost surface of the laminated polyolefin-based film structure is at least 180 degrees Celsius higher than a melting temperature of the innermost surface of the laminated polyolefin-based film structure.

2. The laminated polyolefin-based film structure of claim 1, wherein the first layer and third layer are formed of a material selected from the group consisting of polyethylene-based films which contain at least 90% by weight polyethylene homopolymers, copolymers, or terpolymers and less than 10% by weight other polymer compositions, polypropylene-based films which contains at least 90% by weight polypropylene homopolymers, copolymers, or terpolymers and less than 10% by weight other polymer compositions, and combinations thereof.

3. The laminated polyolefin-based film structure of claim 1, wherein the first layer is formed of a polyethylene-based film which contains at least 90% by weight polyethylene homopolymers, copolymers, or terpolymers and less than 10% by weight other polymer compositions and the third layer is formed of a polyethylene-based film which contains at least 90% by weight polyethylene homopolymers, copolymers, or terpolymers and less than 10% by weight other polymer compositions.

4. The laminated polyolefin-based film structure of claim 3, wherein the first layer is formed of a polyethylene-based films which contain at least 95% by weight polyethylene homopolymers, copolymers, or terpolymers and less than 5% by weight other polymer compositions and the third layer is formed of a polyethylene-based film which contains at least 95% by weight polyethylene homopolymers, copolymers, or terpolymers and less than 5% by weight other polymer compositions.

5. The laminated polyolefin-based film structure of claim 1, wherein the adhesive layer is selected from the group consisting of single component adhesives, two component adhesives, solvent-based adhesives, solventless adhesives, water-based adhesives, acrylic adhesives, extruded polyethylene or polypropylene adhesive systems, electron beam lamination adhesives, and UV lamination adhesives.

6. The laminated polyolefin-based film structure of claim 1, wherein the energy-cured coating has a thickness in the range of 0.78 micron to 2 microns.

7. The laminated polyolefin-based film structure of claim 1, further comprising a printed layer disposed intermediate the first layer and the adhesive layer.

8. A laminated polyolefin-based film structure comprising:
   a first film ply comprising:
      a first layer formed of a polyolefin-based film containing at least 90% by weight polyolefin homopolymers, copolymers, or terpolymers and less than 10% by weight other polymer compositions, the first layer having a first surface and a second surface opposite the first surface; and
      a second layer disposed on the first surface of the first layer, the second layer comprising an energy-cured coating; and
   a second film ply comprising:
      a third layer formed of a polyolefin-based film containing at least 90% by weight polyolefin homopolymers, copolymers, or terpolymers and less than 10% by weight other polymer compositions, the third layer having a first surface and a second surface opposite the first surface;
   a third film ply interposed between the first film ply and the second film ply, the third film ply comprising:
      a fourth layer formed of a polyolefin-based film containing at least 90% by weight polyolefin homopolymers, copolymers, or terpolymers and less than 10% by weight other polymer compositions, the fourth layer having a first surface and a second surface opposite the first surface;
   a first adhesive layer interposed between the first film ply and the third film ply, the first adhesive layer laminating the first film ply to the third film ply, wherein the first surface of the fourth layer faces the second surface of the first layer; and
   a second adhesive layer interposed between the third film ply and the second film ply, the second adhesive layer laminating the third film ply to the second film ply, wherein the first surface of the third layer faces the second surface of the fourth layer;
   wherein a melting temperature of the outermost surface of the laminated polyolefin-based film structure is at least 180 degrees Celsius higher than a melting temperature of the innermost surface of the laminated polyolefin-based film structure.

9. The laminated polyolefin-based film structure of claim 8, wherein the first layer, third layer, and fourth layer are formed of a material selected from the group consisting of polyethylene-based films which contain at least 90% by weight polyethylene homopolymers, copolymers, or terpolymers and less than 10% by weight other polymer compositions, polypropylene-based films which contains at least 90% by weight polypropylene homopolymers, copolymers, or terpolymers and less than 10% by weight other polymer compositions, and combinations thereof.

10. The laminated polyolefin-based film structure of claim 8, wherein the polyolefin-based film of the first layer, the polyolefin-based film of the third layer, and the polyolefin-based film of the fourth layer are recyclable polyolefin-based films.

11. Polyolefin-based film structure of claim 8, further comprising:
   a fourth film ply interposed between the third film ply and the second film ply, the fourth film ply comprising a fifth layer formed of a polyolefin-based film, the fifth layer having a first surface and a second surface opposite the first surface; and
   a third adhesive layer interposed between the fourth film ply and the second film ply, the third adhesive layer laminating the fourth film ply to the second film ply, wherein the first surface of the third layer faces the second surface of the fifth layer.

12. The laminated polyolefin-based film structure of claim 8, wherein:
   the first adhesive layer is selected from the group consisting of single component adhesives, two component adhesives, solvent-based adhesives, solventless adhesives, water-based adhesives, acrylic adhesives, extruded polyethylene or polypropylene adhesive systems, electron beam lamination adhesives, and UV lamination adhesives; and
   the second adhesive layer is selected from the group consisting of single component adhesives, two component adhesives, solvent-based adhesives, solventless adhesives, water-based adhesives, acrylic adhesives, extruded polyethylene or polypropylene adhesive systems, electron beam lamination adhesives, and UV lamination adhesives.

13. The laminated polyolefin-based film structure of claim 8, further comprising a printed layer disposed intermediate the first layer and the first adhesive layer, wherein the printed layer comprises a reverse printed ink layer disposed on the second surface of the first layer.

14. The laminated polyolefin-based film structure of claim 8, wherein the first layer is formed of a polyethylene-based film which contains at least 90% by weight polyethylene homopolymers, copolymers, or terpolymers and less than 10% by weight other polymer compositions, the third layer is formed of a polyethylene-based film which contains at least 90% by weight polyethylene homopolymers, copolymers, or terpolymers and less than 10% by weight other polymer compositions, and the fourth layer is formed of a polyethylene-based polymer composition which contains at least 90% by weight polyethylene homopolymers, copolymers, or terpolymers and less than 10% by weight other polymer compositions.

15. The laminated polyolefin-based film structure of claim 14, wherein the first layer is formed of a polyethylene-based films which contain at least 95% by weight polyethylene homopolymers, copolymers, or terpolymers and less than 5% by weight other polymer compositions, the third layer is formed of a polyethylene-based film which contains at least 95% by weight polyethylene homopolymers, copolymers, or terpolymers and less than 5% by weight other polymer compositions, and the fourth layer is formed of a polyethylene-based film which contains at least 95% by weight polyethylene homopolymers, copolymers, or terpolymers and less than 5% by weight other polymer compositions.

16. A laminated polyolefin-based film structure comprising:

a first film ply comprising:
  a first layer formed of a polyolefin-based film containing at least 90% by weight polyolefin homopolymers, copolymers, or terpolymers and less than 10% by weight other polymer compositions, the first layer having a first surface and a second surface opposite the first surface; and
  a second layer disposed on the first surface of the first layer, the second layer comprising an energy-cured coating and defining an outermost surface of the laminated polyolefin-based film structure;
a second film ply comprising:
  a third layer formed of a polyolefin-based film containing at least 90% by weight polyolefin homopolymers, copolymers, or terpolymers and less than 10% by weight other polymer compositions, the third layer having a first surface and a second surface opposite the first surface wherein the first surface of the third layer faces the second surface of the first layer, the second surface of the third layer defining an innermost surface of the laminated polyolefin-based film structure, wherein the third layer forms a sealant layer configured to form a hermetic seal when sealed to itself or a like surface under sealing conditions in a finished packaging article; and
an adhesive layer interposed between the first film ply and the second film ply;
wherein a melting temperature of the outermost surface of the laminated polyolefin-based film structure is at least 180 degrees Celsius higher than a melting temperature of the innermost surface of the laminated polyolefin-based film structure.

17. The laminated polyolefin-based film structure of claim 16, wherein the first layer and third layer are formed of a material selected from the group consisting of polyethylene-based films which contain at least 90% by weight polyethylene homopolymers, copolymers, or terpolymers and less than 10% by weight other polymer compositions, polypropylene-based films which contains at least 90% by weight polypropylene homopolymers, copolymers, or terpolymers and less than 10% by weight other polymer compositions, and combinations thereof.

18. The laminated polyolefin-based film structure of claim 16, wherein the polyolefin-based film of the first layer and the polyolefin-based film of the third layer are recyclable polyolefin-based films.

19. The laminated polyolefin-based film structure of claim 16, further comprising a forward printed layer disposed on the first surface of the third layer.

20. The laminated polyolefin-based film structure of claim 16, wherein the first layer is formed of a polyethylene-based film which contains at least 90% by weight polyethylene homopolymers, copolymers, or terpolymers and less than 10% by weight other polymer compositions and the third layer is formed of a polyethylene-based film which contains at least 90% by weight polyethylene homopolymers, copolymers, or terpolymers and less than 10% by weight other polymer compositions.

21. The laminated polyolefin-based film structure of claim 20, wherein the first layer is formed of a polyethylene-based films which contain at least 95% by weight polyethylene homopolymers, copolymers, or terpolymers and less than 5% by weight other polymer compositions and the third layer is formed of a polyethylene-based film which contains at least 95% by weight polyethylene homopolymers, copolymers, or terpolymers and less than 5% by weight other polymer compositions.

22. A laminated polyolefin-based film structure comprising:
a first film ply comprising:
  a first layer formed of a polyolefin-based film containing at least 90% by weight polyolefin homopolymers, copolymers, or terpolymers and less than 10% by weight other polymer compositions, the first layer having a first surface and a second surface opposite the first surface; and
  a second layer disposed on the first surface of the first layer, the second layer comprising an energy-cured coating and defining an outermost surface of the laminated polyolefin-based film structure; and
a second film ply comprising:
  a third layer formed of a polyolefin-based film containing at least 90% by weight polyolefin homopolymers, copolymers, or terpolymers and less than 10% by weight other polymer compositions, the third layer having a first surface and a second surface opposite the first surface wherein the first surface of the third layer faces the second surface of the first layer, the second surface of the third layer defining an innermost surface of the laminated polyolefin-based film structure, wherein the third layer forms a sealant layer configured to form a hermetic seal when sealed to itself or a like surface under sealing conditions in a finished packaging article;
a third film ply interposed between the first film ply and the second film ply, the third film ply comprising:
  a fourth layer formed of a polyolefin-based film containing at least 90% by weight polyolefin homopolymers, copolymers, or terpolymers and less than 10% by weight other polymer compositions, the fourth layer having a first surface and a second surface opposite the first surface, wherein the first surface of the fourth layer faces the second surface of the first layer;
a first adhesive layer interposed between the first film ply and the third film ply; and
a second adhesive layer interposed between the third film ply and the second film ply;
wherein a melting temperature of the outermost surface of the laminated polyolefin-based film structure is at least 180 degrees Celsius higher than a melting temperature of the innermost surface of the laminated polyolefin-based film structure.

23. The laminated polyolefin-based film structure of claim 22, further comprising a forward printed layer disposed on the first surface of the fourth layer.

* * * * *